Figure 1:
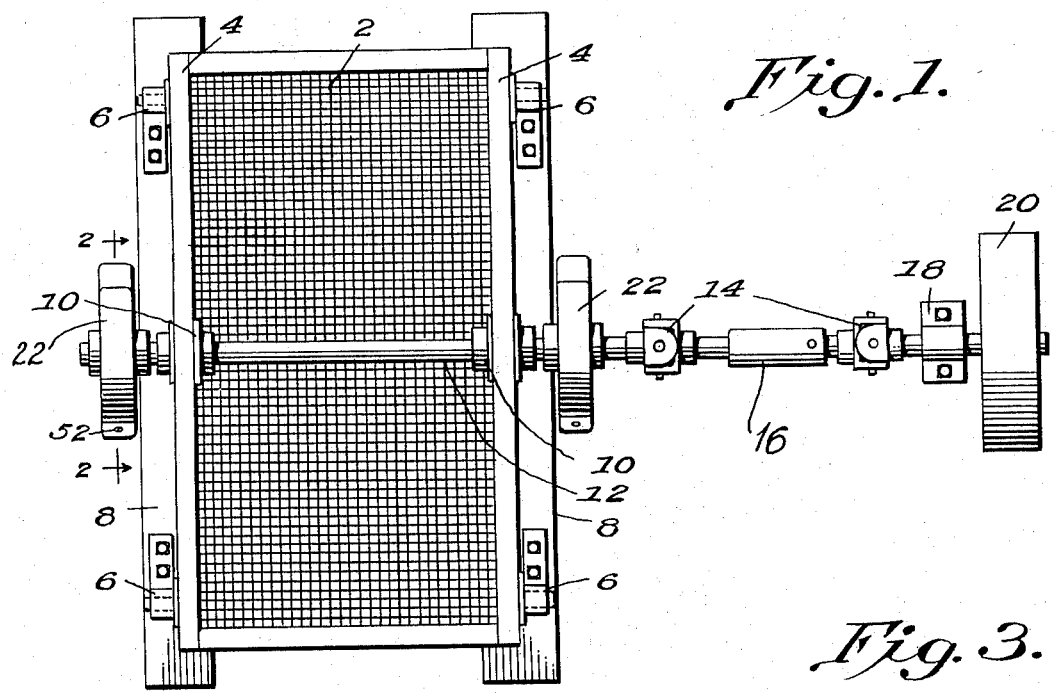

Dec. 8, 1936.                B. B. LACY                2,063,509
                         VIBRATING DRIVE
                       Filed May 2, 1935

Inventor
Benjamin B. Lacy
By Knight Bros
   His   Attorneys

Patented Dec. 8, 1936

2,063,509

UNITED STATES PATENT OFFICE 2,063,509

VIBRATING DRIVE

Benjamin B. Lacy, Houston, Tex.

Application May 2, 1935, Serial No. 19,511

5 Claims. (Cl. 74—61)

This invention relates to devices for translating rotary motion into gyrating or vibrating motion and has for its object to provide a device of this kind which will remain ineffective during acceleration of the rotary drive and will come into operation only when a speed approaching that of normal operation is reached.

It has been found that the acceleration of gyrating or vibrating devices is attended by excessive shaking of the whole machine as certain speeds are passed through. This difficulty is avoided by my invention by rendering the gyrating or vibrating device operative only after the critical speeds which cause convulsions of the machine have been passed. Preferably the gyrating or vibrating motion is made to start as the machine approaches its normal operating speed and to attain its full amplitude when that speed has been reached.

This invention is of particular importance in unbalanced driving devices, such as are used for vibrating sieves having a reciprocating or gyrating motion, all of which motions I shall refer to herein as vibrating motions. These devices run at fairly high rotary speeds, usually around 1800 R. P. M., and while they operate smoothly at the speed for which they are intended, during acceleration they pass through certain speeds at which the vibration increases to a violent convulsion, which taxes the strength of the machine and puts such a load upon the prime mover as to require the use of a higher power than is needed in normal operation. The difficulty is particularly serious when the prime mover is not one having steady characteristics, such as an electric motor, but is, for example, a steam turbine, the speed of which may fluctuate in response to conditions such as water in the steam line. If the machine runs for any considerable time at the unfavorable speeds mentioned, serious damage is apt to occur.

My invention eliminates this difficulty by using an unbalancing mechanism which remains balanced while the machine is accelerating and which becomes unbalanced only when the speed of normal operation is approached. Preferably the unbalancing mechanism is of such form that the change from balanced to unbalanced condition is reversible, so that the convulsions are avoided during deceleration as well as acceleration and also during any temporary sub-normal speed.

In accordance with a further feature of the invention the balancing mechanism may be adapted to change to a balanced condition again if the normal speed is exceeded, thus overcoming the temptation of the workman to speed up the engine with the thought of getting through the work faster, but without due regard to the limitations of the machine. For instance, the machine may be designed so as to be unbalanced only at a speed between 1700 and 2000 R. P. M. and not above or below that range.

Figure 3:
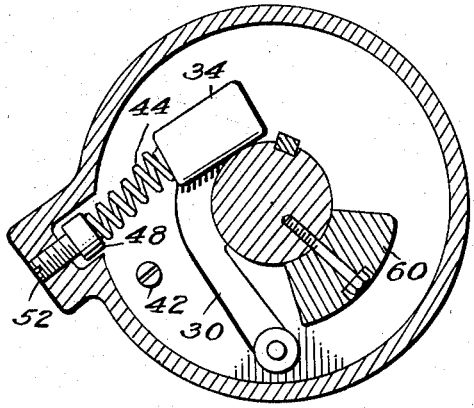
Figure 2:
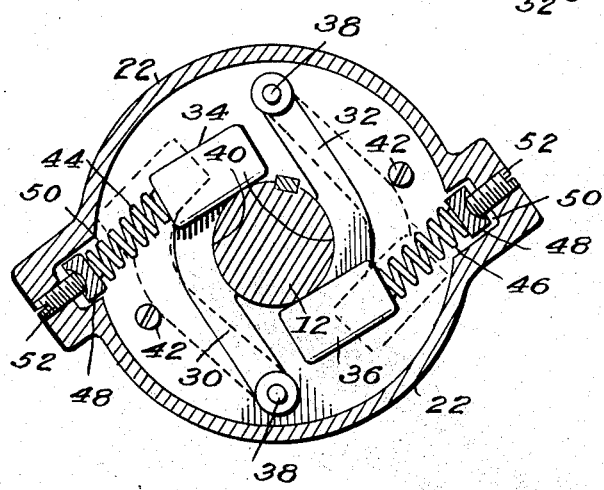

The invention will be further explained with reference to illustrative examples shown in the drawing, in which Fig. 1 is a somewhat diagrammatic plan view of a shaking sifter with which the invention may be used, Fig. 2 is a section through one of the unbalancing mechanisms, on the line 2—2 of Fig. 1, and Fig. 3 is a similar section through another form of unbalancing mechanism.

The drawing shows a sieve comprising a screen 2 and side plates 4 supported by springs 6 upon bed pieces 8. In the side boards 4 are bearings 10 in which is journalled a shaft 12. The shaft 12 is connected through two universal joints 14 and an extensible shaft section 16 with the shaft 18 of a prime mover 20, for instance a steam turbine. Upon both sides of the sieve, housings 22 are fixed to the shaft 12 and these housings contain the unbalancing mechanism which embodies this invention. It is well known that with a rig of the kind described, with unbalanced eccentric weights at the location of the housings 22, when the shaft 12 is rotated the sieve will be made to vibrate or gyrate, according to the nature of its supporting means, by the centrifugal forces exerted by the unbalanced weights.

Referring now to Fig. 2, the housing 22 contains two arms 30 and 32, each bearing at its ends a weight 34, 36 and each being pivoted at its opposite end by a pin 38 to the side wall or walls of the housing. The arms may have cylindrical abutments 40 which rest against shaft 12 when the arms are in their inner positions, and they can swing outward to the dotted line positions, where they are stopped by screws 42. The weighted ends of the arms are urged inward by springs 44, 46, the outer ends of which bear against stops 48 located in recesses 50 of the housing and adjustable by means of set screws 52. The spring 46 is stiffer than spring 44, either because of being of a heavier size, or being adjusted to a greater degree of compression by its set screw, or both.

The unbalancing device operates in the following manner: During the acceleration of the shaft 12 and the unbalancing mechanism, the weighted arms 30 and 32 are held in against the shaft by the springs 44 and 46. In this position the weighted arms, which lie in the same plane transverse to the rotary axis, balance each other and the mechanism revolves freely without vibration, accelerating easily towards the lower limit of its normal range of operating speed. On approaching the lower limit of the normal operating speed, say 1700 R. P. M., the centrifugal force of the weight 34 begins to exceed the stress due to the initial compression of the spring 44. By the time the lower limit of the operating range has been reached the arm 30 has moved out to the dotted line position, which unbalances the mechanism increasingly as the weight moves out and causes the sieve to vibrate. The weight 36 is still held in its inner position, due to the greater initial stress of its spring 46. If the speed of the shaft is increased still more until it reaches the upper limit of the normal operating range, say 2000 R. P. M., the centrifugal force of weight 36 begins to exceed the initial stress of the spring 46 and the arm 32 starts to move out toward dotted line position. If the speed continues to increase, the arm 32 finally reaches the dotted line position and thus balances the mechanism again. The unbalancing mechanism will therefore vibrate the sieve only within the range at which it is intended to be operated and this range can be accurately controlled by adjustment of the screws 52.

While the form of mechanism shown in Fig. 2 is the preferred embodiment of the invention, it may be changed in many ways without departing from the scope of the invention. For example, if the super-normal speed feature can be dispensed with, the mechanism may take the form shown in Fig. 3, wherein the balancing arm 32 of Fig. 2 is replaced by a stationary weight 60, which balances the weighted arm 30, 34 while the latter is in inner position.

The invention is not restricted to two weights, though that will ordinarily be sufficient. For example, another pair of weights may be added which will be held in, until a speed still higher than that at which the second weight moves out, when a third weight will move out to unbalance the mechanism again. This would afford two distinct normal operating speeds.

While the unbalancing mechanism is preferably enclosed in a housing to protect it from the weather and for greater safety, it may also take the form of an exposed mechanism.

In its broader aspects the invention is not confined to unbalanced driving means, but applies also to crank drives wherein the crank pin can be made to shift from a concentric to an eccentric position in a similar way, in response to centrifugal means.

Having described my invention.

I claim:

1. The combination with a power driven shaft, of two weights connected thereto so as to revolve therewith, each of said weights having a limited movement outward from said shaft, said weights being adapted to balance each other when both are in inner position and when both are in outer position, and means normally holding said weights in and responsive to the centrifugal force of said weights to permit said weights to move outward upon attaining predetermined speeds of revolution which are different for the two weights.

2. An unbalancing mechanism, comprising a rotary member, balanced weighted arms pivoted thereto having a limited swing outward from the axis of said rotary member, and springs of different strength restraining outward movement of said arms.

3. An unbalancing mechanism, comprising an initially balanced rotary mechanism, means operative at a predetermined rotary speed to unbalance said mechanism, and means operative at a predetermined higher rotary speed to restore the balance of said mechanism.

4. The combination with a power driven rotary member, of means for unbalancing said member, comprising two mutually balancing weights connected to said member so as to revolve therewith and arranged in the same plane transverse to the axis of said member, one of said weights being movable eccentrically in said transverse plane at a predetermined rotary speed while the other weight is held in a fixed position with respect to the axis of said member, the other of said weights being also movable eccentrically in said transverse plane to rebalance said mechanism at a higher rotary speed than that at which said first weight moves out.

5. An unbalancing device, comprising an initially balanced rotary mechanism containing a plurality of weights movable eccentrically at different rotary speeds of said mechanism, said weights balancing said mechanism in outer position as well as in inner position, but not when in opposite positions.

BENJAMIN B. LACY.